United States Patent [19]
Marshall

[11] Patent Number: 6,146,050
[45] Date of Patent: Nov. 14, 2000

[54] METHOD AND APPARATUS FOR ROTATABLY COUPLING AND ERECTING TRIPODS FOR TEPEES

[76] Inventor: Alexander Charles Marshall, P.O. Box 115, Burton, British Columbia, Canada, V0G 1Z0

[21] Appl. No.: 09/238,763

[22] Filed: Jan. 28, 1999

Related U.S. Application Data

[60] Provisional application No. 60/072,983, Jan. 29, 1998.

[51] Int. Cl.[7] .......................... E04H 15/24; E04H 15/32; F16C 11/00; E04B 1/38
[52] U.S. Cl. .......................... 403/400; 403/160; 403/217; 135/100; 135/120.3; 135/909; 52/655.1; 248/431; 248/74.1
[58] Field of Search ..................................... 403/160, 217, 403/400; 135/100, 120.1, 120.2, 120.3, 909; 52/645, 646, 655.1; 248/431, 74.1

[56] References Cited

U.S. PATENT DOCUMENTS

| | | |
|---|---|---|
| 1,048,704 | 12/1912 | King . |
| 2,442,000 | 5/1948 | Furnas . |
| 2,777,657 | 1/1957 | Zent . |
| 3,042,052 | 7/1962 | Des Rosier . |
| 3,176,698 | 4/1965 | Warner . |
| 3,779,259 | 12/1973 | Fuller . |
| 4,011,880 | 3/1977 | Shoults . |
| 4,214,841 | 7/1980 | Hayashi ................................. 403/188 |
| 4,450,851 | 5/1984 | Beavers ................................. 135/109 |
| 4,483,334 | 11/1984 | Murray .............................. 403/400 X |
| 4,838,293 | 6/1989 | Novak . |
| 4,944,322 | 7/1990 | Gillis . |
| 5,439,016 | 8/1995 | Grahn . |
| 5,634,619 | 6/1997 | Alessi . |
| 5,876,091 | 3/1999 | Chernomashentsev ................ 297/16.2 |

*Primary Examiner*—Robert Canfield
*Attorney, Agent, or Firm*—Antony C. Edwards

[57] ABSTRACT

A coupling device for rotatably coupling poles of a tepee tripod. A first clamp clamps onto an upper end of a first pole. A second clamp clamps onto an upper end of a second pole. A third clamp clamps onto an upper end of a third pole. First and second rotatable couplers rotatably couple the first clamp to the second clamp, and the first clamp to the third clamp. The first coupler is rotatable about a first axis of rotation, so as to allow relative rotation between the first and second clamps. The second coupler is rotatable about a second axis of rotation so as to allow relative rotation between the first and third clamps. The first and second axes of rotation lie in a plane generally perpendicular to a first longitudinal axis corresponding to the first pole when the first clamp is clamped onto the first pole. The first and second axes of rotation intersect the first longitudinal axis. The first and second axes of rotation are radially spaced apart relative to the first longitudinal axis.

7 Claims, 3 Drawing Sheets

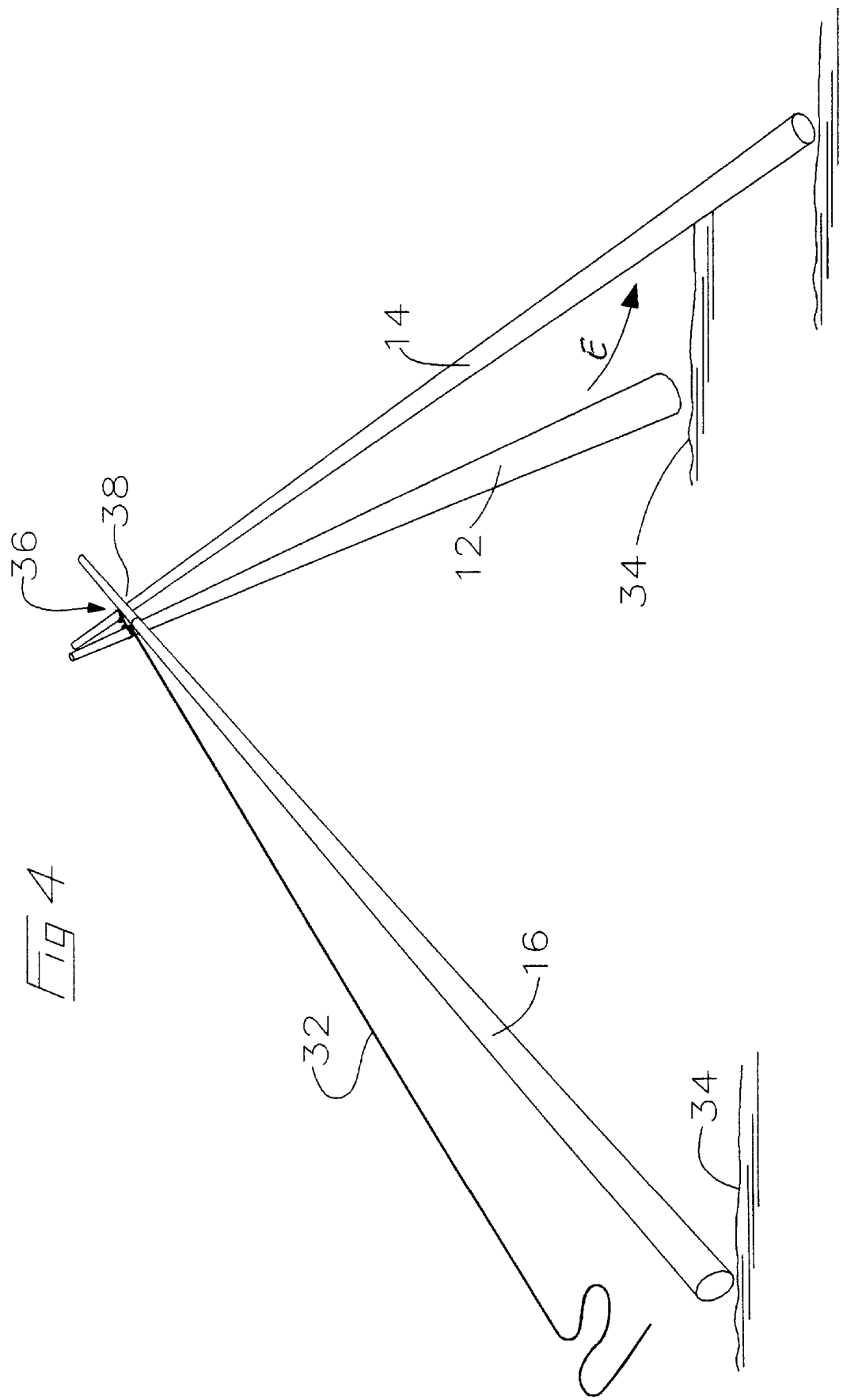

6,146,050

METHOD AND APPARATUS FOR ROTATABLY COUPLING AND ERECTING TRIPODS FOR TEPEES

CROSS REFERENCE TO RELATED APPLICATION

This application claims priority from United States Provisional Patent Application No. 60/072,983 filed Jan. 29, 1998 titled METHOD AND APPARATUS FOR ROTATABLY COUPLING AND ERECTING TRIPODS FOR TEPEES.

FIELD OF THE INVENTION

This invention relates to the field of tripods which form the primary supporting structure for tepees or tepee-like tents, and in particular, to an apparatus for pivotally mounting tripod structural members at the vertex of the tripod and a method of employing the apparatus for erecting the tripod.

BACKGROUND OF THE INVENTION

Tepees are of course well known. One method of constructing a tepee is to first form a tripod structure. The tripod structure by definition has three poles, respectively referred to herein as a north pole, a south pole, and a door pole. In the past, the vertex of the tripod, that is, where the three poles intersect once erected, have been joined by lashing or other means allowing the poles to be spread at the base of the tripod. Spreading the tripod poles forms "crotches" between the upper ends of the poles which extend upwardly from the vertex of the tripod. Other auxiliary poles are then laid into the crotches in a radially spaced apart array around the base of the tepee structure. A flexible covering may then be laid over the tripod poles and auxiliary poles to form the generally right circular cone-shape characteristic of tepees.

In the prior art, Applicant is aware of U.S. Pat. No. 3,779,259 which issued Dec. 18, 1973 to Fuller for a Collapsible Protective Structure. The Collapsible Protective Structure of Fuller provides a tent structure which once erected is essentially cone-shaped. Two truss poles are crossed above the peak of the tent and secured at their vertex by a collar-like pole harness.

Applicant is also aware of U.S. Pat. No. 5,439,016 which issued Aug. 8, 1995 to Grahn for a Tent and Method for Pitching Thereof. Grahn discloses a substantially cone-shaped tent wherein radially spaced apart rods are connected at their uppermost ends to a ring mounted within a support arrangement, wherein the support arrangement forms the vertex of the cone formed by the tent.

Applicant is also aware of U.S. Pat. No. 4,838,293 which issued Jun. 13, 1989 to Novak for a Tepee Tent, wherein a tepee tent structure is supported on rigid tent poles, the rigid tent poles supported at their upper extremities by an apex cup having sockets for rigidly securing the tent poles in the cup.

Applicant is also aware of U.S. Pat. No. 3,042,052 which issued to Rosier for a Portable Tepee, which teaches a tepee comprising a collapsible conical frame structure including a plurality of upwardly converging poles terminating in crossed upper end portions. A ring pivotally connects the upper portions of the poles, whereby the poles may be swung substantially into parallelism for collapsing the frame structure. The ring has spaced slots therein. Studs on the poles loosely engage in the slots so that the poles may be rocked transversely on the periphery of the ring.

Applicant is also aware of U.S. Pat. No. 4,011,880 which issued Mar. 15, 1977 to Shoults for a Tent Structure, wherein tent staves which form a tent structure are joined at their upper ends by a common pin.

What is neither taught nor suggested in the prior art of which applicant is aware is the pivotal coupling of three pole clamps at the vertex of the tepee tripod, where each of the clamps is secured to a corresponding tripod pole as better described below.

SUMMARY OF THE INVENTION

The present invention may be summarized as a coupling device for rotatably coupling poles of a tepee tripod. A first clamp clamps onto an upper end of a first pole. A second clamp clamps onto an upper end of a second pole. A third clamp clamps onto an upper end of a third pole. First and second rotatable couplers rotatably couple the first clamp to the second clamp, and the first clamp to the third clamp. The first coupler is rotatable about a first axis of rotation, so as to allow relative rotation between the first and second clamps. The second coupler is rotatable about a second axis of rotation so as to allow relative rotation between the first and third clamps. The first and second axes of rotation lie in a plane generally perpendicular to a first longitudinal axis corresponding to the first pole when the first clamp is clamped onto the first pole. The first and second axes of rotation intersect the first longitudinal axis. The first and second axes of rotation are radially spaced apart relative to the first longitudinal axis.

Advantageously, the first and second axes of rotation are radially spaced apart by an included angle of approximately 90 degrees.

In one aspect of the present invention, the first rotatable coupler comprises a first threaded stud mounted on the second clamp so as to lie generally along the first axis of rotation. A first threaded nut is mounted on the first clamp so as to cooperate in threaded engagement with the first threaded stud. The second rotatable coupler comprises a second threaded stud mounted on the third clamp so as to lie generally along the second axis of rotation. A second threaded nut is mounted on the first clamp so as to cooperate in threaded engagement with the second threaded stud.

In a second aspect of the present invention. The first, second and third clamps each comprise a U-bolt and rigid cross-member mountable across opposite ends of said U-bolt. The first threaded stud is mounted onto the rigid cross member of the second clamp, generally centrally disposed thereon, and the second threaded stud is mounted onto the rigid cross member of the third clamp, generally centrally disposed thereon. The first and second threaded nuts are mounted onto the cross member of the first clamp.

In a further aspect of the present invention, the first and second couplers are limited to one degree of rotational freedom.

BRIEF DESCRIPTION OF THE INVENTION

FIG. 4 is, in perspective view, a tepee tripod being erected according to the method of the present invention.

DETAILED DESCRIPTION OF THE PREFERRED EMBODIMENT

Figure 1:
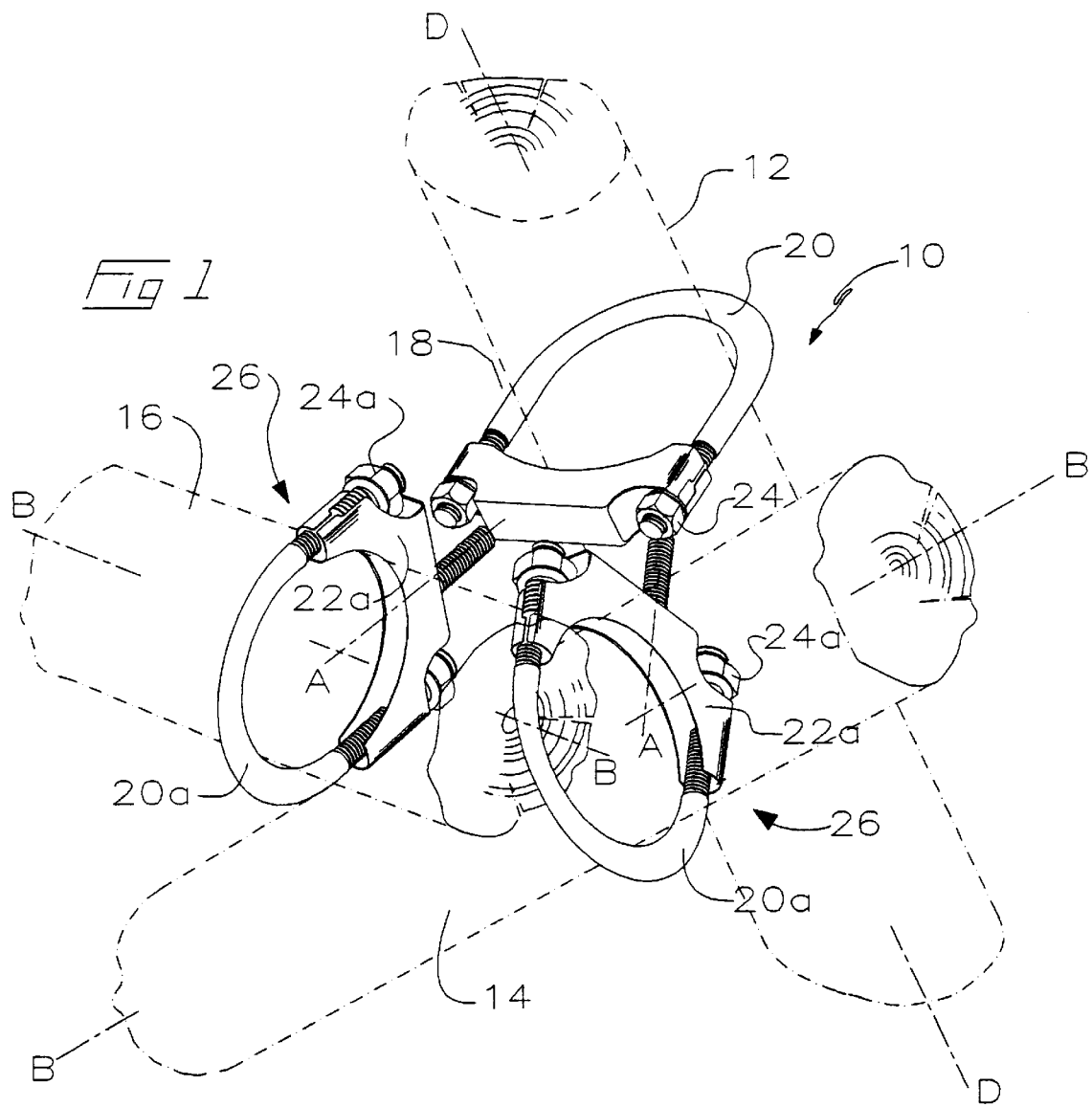
FIG. 1 is, in partially exploded perspective view, the base clamp and auxiliary clamps forming the coupling device of the present invention mounted at the vertex of a tepee tripod.
Figure 2:
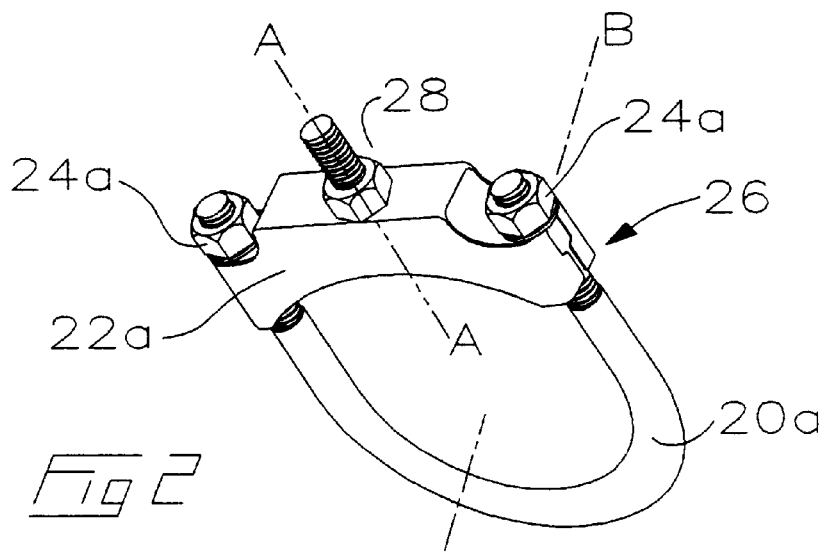
FIG. 2 is, in perspective view, an auxiliary clamp according to the present invention.
Figure 3:
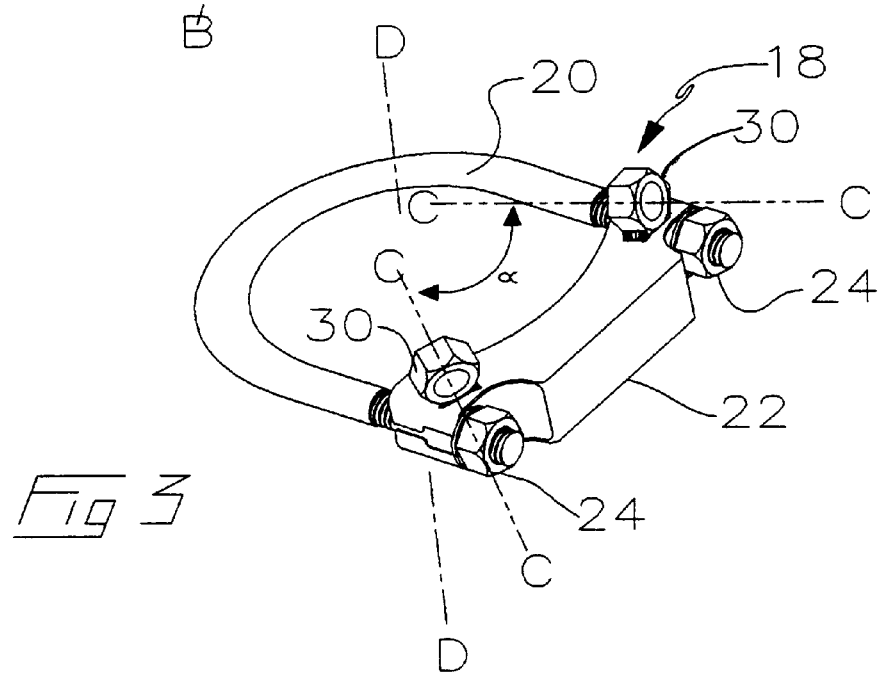
FIG. 3 is, in perspective view, a base clamp according to the present invention.

As seen in FIGS. 1–3, the present invention is a coupling device 10 for pivotally coupling the three primary support poles forming a tripod onto which a completed tepee structure may be mounted. The tripod is formed of a south pole 12, a north pole 14 and a door pole 16.

A base clamp 18, which as shown may be a U-shaped yoke member 20. Yoke member 20 has threaded ends. A rigid cross member 22 having corresponding holes at its ends is slid onto the threaded ends of yoke member 20 so as to extend across the opening of yoke member 20. Rigid cross member 22 is retained on the threaded ends of yoke member 20 by means of nuts 24. The combination of yoke member 20 and cross member 22 may take the form of conventional muffler clamps or pipe hangers so long as threading nuts 24 onto the threaded ends of yoke member 20 may clamp rigid cross member 22 against south pole 12. Thus base clamp 18 may be rigidly secured to south pole 12 at a position along south pole 12 where it is desirable to place the vertex of the tripod. Such a position would be known to a person skilled in the art.

Similarly, auxiliary clamps 26 are mounted onto north pole 14 and door pole 16. Rigid cross members 22a are slidably mounted onto the threaded ends of yoke members 20a and secured thereon by means of nuts 24a to form clamps 26. With a pole placed into a yoke tightening nuts 24a onto the threaded ends of yoke members 20a, tightens rigid cross members 22a down onto the pole so as to rigidly clamp the auxiliary clamps 26 onto the pole. An auxiliary clamp 26 is so clamped onto both north pole 14 and onto door pole 16. Advantageously, nuts 24 should not be overtightened. Once nuts 24 have been tightened, protruding ends of the threaded ends of yoke members 20 and 20a are advantageously cut off.

Auxiliary clamps 26 are rotatably coupled to base clamp 18. Threaded studs 28 extend perpendicularly from cross members 22a, and are rotatable relative to base clamp 18 when in threaded engagement within stud nuts 30. Threaded studs 28 are welded or otherwise rigidly mounted to rigid cross members 22a so that the longitudinal axes A of threaded studs 28 intersect the longitudinal axes B of the north and door poles generally perpendicularly. Thus, threaded studs 28 may be mounted perpendicular to rigid cross members 22a so as to bisect the opening between the threaded ends of yoke members 20a.

Stud nuts 30 are rigidly mounted as by welding or the like to rigid cross member 22, or may be formed as an integral part thereof, so that the longitudinal axis C each of threaded cavity in both stud nuts 30 lie in a plane generally parallel to the plane containing yoke member 20. Stud nuts 30 are oriented relative to rigid cross member 22 so that longitudinal axes C also perpendicularly intersect the longitudinal axis D of south pole 12. Advantageously, longitudinal axes C form an included angle α between the axes of approximately 90 degrees so that the poles do not interfere with each other when rotated during erection of the tepee tripod. Obviously, when threaded studs 28 are threaded into stud nuts 30 so as to rotatably couple auxiliary clamps 26 to base clamp 18, longitudinal axes A of threaded studs 28 are co-linear with the corresponding longitudinal axes C of stud nuts 30.

The present invention is not intended, however, to be limited to this one arrangement for rotatably coupling the auxiliary clamps to the base clamp. Other forms of rotatable couplers could also be made to work by one skilled in the art, for example, a swivel having one degree of freedom (i.e. rotatable about a single longitudinal axis).

Once the coupling at the tripod vertex 38 (seen in FIG. 4) is assembled using coupling device 10 as described above, a rope 32 may be attached, for example by tying, in the coupling between north pole 14 and south pole 12. With the north and south poles positioned lying on the ground so as to be generally parallel to each other, and with door pole 16 also lying on the ground, but spread apart from the north and south poles, so as to form a triangular shape, rope 32 may be tensioned so as to pivot to the upright the triangular shape formed by the north and south poles on one side of the rope and the door pole on the other side. Manual assistance may be required to initially lift the vertex 38 of the tripod poles as a person pulls on rope 32. Also, the ground or base end of south pole 12 and door pole 16 should be secured relative to the ground 34, for example, by having assistants stand on those ends, or for example by placing the base ends within pegged pitching boxes or otherwise in base securing means. Once the poles have been raised and the triangular shaped structure steadied by use of rope 32, north pole 14 is rotated in direction E away from its parallel relation with south pole 12 so as to form the third leg of the tripod as seen in FIG. 4.

With the tripod thus erected, auxiliary poles may be laid into the crotches 36 formed between the upper ends of the north, south and door poles which extend above the vertex 38 of the tripod. A supporting structure for the tepee covering is thus formed by the auxiliary poles being placed in radially spaced array around the base of the tripod so as to generally form a right circular cone.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tepee tripod coupling device, for rotatably coupling first, second and third poles of said tepee tripod, comprising:
    a first clamp for clamping onto an upper end of said first pole,
    a second clamp for clamping onto an upper end of said second pole,
    a third clamp for clamping onto an upper end of said third pole,
    a first rotatable coupler for rotatably coupling said first clamp to said second clamp,
    a second rotatable coupler for rotatably coupling said first clamp to said third clamp,
    said first coupler rotatable about a first axis of rotation, so as to allow relative rotation between said first and second clamps,
    said second coupler rotatable about a second axis of rotation so as to allow relative rotation between said first and third clamps,
    said first and second axes of rotation lying in a plane generally perpendicular to a first longitudinal axis corresponding to said first pole when said first clamp is clamped onto said first pole,
    said first and second axes of rotation intersecting said first longitudinal axis, said first and second axes of rotation radially spaced apart relative to said first longitudinal axis.

2. The coupling device of claim 1 wherein said first and second axes of rotation are radially spaced apart by an included angle of approximately 90 degrees.

3. The coupling device of claim 2 wherein said first rotatable coupler comprises a first threaded stud mounted on said second clamp so as to lie generally along said first axis of rotation, a first threaded nut mounted on said first clamp so as to cooperate in threaded engagement with said first threaded stud, and wherein said second rotatable coupler comprises a second threaded stud mounted on said third clamp so as to lie generally along said second axis of rotation, a second threaded nut mounted on said first clamp so as to cooperate in threaded engagement with said second threaded stud.

4. The coupling device of claim 2 wherein said first, second and third clamps each comprise a U-bolt and rigid cross-member mountable across opposite ends of said U-bolt.

5. The coupling device of claim 3 wherein said first, second and third clamps each comprise a U-bolt and rigid cross-member mountable across opposite ends of said U-bolt.

6. The coupling device of claim 5 wherein said first threaded stud is mounted onto said rigid cross member of said second clamp, generally centrally disposed thereon, and said second threaded stud is mounted onto said rigid cross member of said third clamp, generally centrally disposed thereon, and said first and second threaded nuts are mounted onto said cross member of said first clamp.

7. The coupling device of claim 2 wherein said first and second couplers are limited to one degree of rotational freedom.

* * * * *